United States Patent [19]

Ealding et al.

[11] 4,149,920

[45] Apr. 17, 1979

[54] PROCESS FOR MOULDING UNSATURATED POLYESTER ARTICLES

[75] Inventors: Cyril J. Ealding, Puckeridge; Keith E. Brealey, Potters Bar, both of England

[73] Assignee: Imperial Chemical Industries Limited, London, England

[21] Appl. No.: 725,684

[22] Filed: Sep. 23, 1976

[30] Foreign Application Priority Data

Oct. 17, 1975 [GB] United Kingdom ............... 42737/75

[51] Int. Cl.$^2$ .......................... B29B 3/00; B32B 27/36
[52] U.S. Cl. .................................. 156/243; 156/324; 156/332; 428/454; 428/480; 428/910; 428/483; 428/520; 264/171; 264/331
[58] Field of Search ....................... 156/243, 324, 332; 428/503, 520, 483, 481, 482, 480, 442, 40, 411, 454, 910; 264/171, 331

[56] References Cited

U.S. PATENT DOCUMENTS

| | | | |
|---|---|---|---|
| 2,892,747 | 6/1959 | Dye | 428/482 X |
| 2,961,365 | 11/1960 | Sroog | 428/285 |
| 3,054,703 | 9/1962 | Brasure | 428/482 |
| 3,515,626 | 6/1970 | Duffield | 428/910 X |
| 3,832,268 | 8/1974 | Smith | 428/483 X |
| 3,950,206 | 4/1976 | Adachi et al. | 428/910 |

FOREIGN PATENT DOCUMENTS

| | | |
|---|---|---|
| 1594543 | 6/1970 | France. |
| 2194571 | 1974 | France. |
| 798098 | 7/1958 | United Kingdom. |
| 838708 | 6/1960 | United Kingdom. |
| 1113389 | 5/1968 | United Kingdom. |
| 1152724 | 5/1969 | United Kingdom. |
| 1167765 | 10/1969 | United Kingdom. |
| 1221267 | 2/1971 | United Kingdom. |
| 1392841 | 4/1975 | United Kingdom. |

*Primary Examiner*—P. C. Ives
*Attorney, Agent, or Firm*—Cushman, Darby & Cushman

[57] ABSTRACT

A process for the production of moulded articles, such as sheet laminates, which comprises applying and curing a layer of a curable unsaturated polyester resin to a forming layer of film composite, e.g., a polyethylene terephthalate film layer, and a polymeric adhesive layer, consisting essentially of an isophthalate/terephthalate copolyester.

7 Claims, No Drawings

PROCESS FOR MOULDING UNSATURATED POLYESTER ARTICLES

This invention relates to a process for the production of moulded articles comprising a layer of an unsaturated polyester resin and to the articles themselves.

Moulded articles produced from unsaturated polyester resins are already known. Such articles are often reinforced with particulate fillers or fibrous additives such as glass rovings, articles reinforced with glass rovings often being termed glass-reinforced polyester (grp). Articles moulded from glass-reinforced polyester are commonly made by applying a mixture of glass rovings and an unsaturated polyester resin, together with a curing catalyst for the resin, to a mould and allowing or causing the resin to cure. An unreinforced resin layer or gel coat, which may however be pigmented, may be applied to the mould before the glass-filled layer to provide a decorative surface to the moulded article.

There is a risk, particularly in articles which do not include a gel coat, that some ends of the glass rovings may become exposed at the surface of the moulded article thereby providing channels for moisture and water penetration into the bulk of the moulding, with subsequent hydrolysis and break-down of the polyester resin. Moisture intake followed by freezing conditions may also result in damage to the article.

This invention relates to a process for the production of moulded articles produced from unsaturated polyester resins which are provided with at least one facing layer of a synthetic thermoplastic material.

According to the present invention, a process for the production of a moulded article comprises bonding a layer of a curable unsaturated polyester resin to the polymeric adhesive layer of a film composite comprising a layer of a synthetic thermoplastic material and a polymeric adhesive layer.

The invention also relates to a moulded article which comprises a layer of a cured unsaturated polyester resin and a layer of a synthetic thermoplastic film composite bonded to at least one face thereof, wherein the film composite comprises a layer of synthetic thermoplastic material and a polymeric adhesive layer, and the unsaturated polyester resin layer is bonded to the adhesive layer of the film composite.

Moulded articles produced according to this invention may, as appropriate, be provided with a facing surface formed from the film composite on one or both faces.

The nature and chemistry of the curable unsaturated polyester resins forms no part of this invention: the resins are already well known in the art. The agents for initating and/or catalysing the curing operation and the conditions for curing are also well known. A description of suitable resins and agents and conditions for curing them is given in 'Polyesters'—Volume 2, Unsaturated Polyesters and Polyester Plasticisers, Parkyn, Lamb and Clifton, Iliffe 1967.

The layer of synthetic thermoplastic material may comprise any suitable material, e.g. polyamides, polymers and copolymers of vinyl chloride, polycarbonates, polymers and copolymers of olefines such as polypropylene, polysulphones and highly polymeric film and fibre-forming linear polyesters of dibasic aromatic carboxylic acids and dihydric alcohols. Suitable linear polyesters may be produced by condensing one or more dicarboxylic acids or their lower alkyl diesters, e.g. terephthalic acid, isophthalic acid, phthalic acid, 2,5-, 2,6-and 2,7-naphthalene dicarboxylic acid, succinic acid, sebacic acid, adipic acid, azelaic acid, diphenyl dicarboxylic acid, and hexahydrotetephathalic acid, or bis-p-carboxyl phenoxy ethane, optionally with a monocarboxylic acid, such as pivalic acid, with one or more alkylene glycols, e.g. ethylene glycol, 1,3-propanediol, 1,4-butanediol, neopentyl glycol and 1,4-cyclohexane-dimethanol. The preferred linear polyester is polyethylene terephthalate. Known additives may, if desired, be included in the thermoplastic material. Suitable additives include dyes and pigments and ultra-violet light-absorbing materials which provide protection against degradation in external end uses. The exposed surface of the thermoplastic layer may be printed and/or metallised with a decorative pattern.

When the moulded articles are produced in the form of sheets, the facing film composite may take the form of a self-supporting film of which the layer of synthetic thermoplastic material may optionally be biaxially oriented and heat set, a layer comprising a biaxially oriented and heat-set film of polyethylene terephthalate. Polyethylene terephthalate films are usually stretched in mutually perpendicular directions to impart molecular orientation and dimensionally stabilised by heat setting, e.g. as disclosed in British Specification 838 708. A similar process may be employed to orient the layer of synthetic thermoplastic material when it comprises a linear polyester.

In moulded articles in the form of sheets which are to be employed for the external cladding of buildings, e.g. as a substantially transparent roofing material, the surface of the thermoplastic layer may be coated with a very thin metallic layer for solar control purposes.

A profiled article may be produced by shaping the article after uniting the curable unsaturated polyester resin layer with the film composite but prior to curing or after partially curing the unsaturated polyester resin, curing being effected or completed after shaping has been accomplished.

The invention also relates to moulded articles shaped into forms other than flat sheets. Thus the facing film composite may be moulded by, for example, vacuum or blow moulding or injection moulding, into a shaped article prior to the application of the layer or curable polyester resin. Films of amorphous polyethylene terephthalate may be shaped by vacuum forming for use according to this aspect of the invention.

The layer of synthetic thermoplastic material may be of any suitable thickness, generally up to about 175 microns. For example, such a layer may be formed from an oriented film of polyethylene terephthalate of thickness about 12 microns.

The polymeric adhesive layer should be adherent to both the layer of synthetic thermoplastic material and the applied unsaturated polyester resin in order to facilitate bonding between them. In one preferred embodiment of the invention, the film composite comprises a polyethylene terephthalate layer and an adhesive layer comprising a linear copolyester. Suitable copolyester adhesives comprises isophthalate with one or more alkylene glycols such as ethylene glycol, especially copolyesters and 35 to 5 mole % ethylene isophthalate with ethylene glycol. A particularly suitable copolyester is that of 80 mole % ethylene terephthalate and 20 mole % ethylene isophthalate with ethylene glycol. Copolyesters derived from terephthalic acid and other dibasic aromatic carboxylic acids, e.g. azelaic acid and sebacic acid, may be used for the production of the adhesive layer. When film composites employing copolyester adhesive layers are used they may be produced by applying the copolyester layer to an oriented and heat-set film of polyethylene terephthalate or alternatively the composite may be produced by coextrusion and then stretched to orient the polyethylene terephthalate layer and heat set. Alternativley, the film composite may be produced by casting the polymeric adhesive layer onto the layer of the synthetic thermoplastic material.

Alternative polymeric adhesive layers may comprise:

(a) copolymers of lower alkyl esters of acrylic acid and/or methacrylic acid in which the alkyl group contains one to six carbon atoms, especially copolymers derived from ethyl acrylate and methyl methacrylate optionally together with one or more other comonomers such as substituted or unsubstituted acrylamide or methacrylamide; an effective copolymer comprises ethyl acrylate, methyl methacrylate and methacrylamide preferably in the proportions 45, 50 and 5% by weight respectively. Such copolymers are preferably cross-linked with an added cross-linking agent such as an alkoxylated melamine formaldehyde condensation product;

(b) copolymers of vinylidene chloride with other copolymerisable monomers such as acrylonitrile, e.g. a copolymer of vinylidene chloride and acrylonitrile in the proportions 88 and 12% by weight respectively;

(c) polyesters and copolyesters of one or more dibasic aromatic carboyxlic acids with one or more dihydric alcohols, e.g. a low molecular polyester derived from isophthalic acid and diethylene glycol which can be applied as an aqueous solution to the synthetic thermoplastic layer. Such polyesters and copolyesters may optionally be modified by the addition of cross-linking agents such as an alkoxylated melamine formaldehyde condensation product;

(d) triethanolamine titanate and tributylamine titanate.

Film composites comprising such copolymeric adhesive layers may be produced by an process known in the art, e.g. by applying the layer as an aqueous solution or dispersion or as a solution in an organic solvent to the layer of the synthetic thermoplastic material.

The curable unsaturated polyester resin may contain finely divided particulate fillers and/or fibrous reinforcement such as glass fibres. Pigments may also be included where appropriate. It is also possible, when the reisn layer contains a filler and/or reinforcement and the moulded article is faced on one face only with a layer of synthetic thermoplastic material, to provide the exposed face of the unsaturated polyester resin with a resin gel coat which may be pigmented for decorative purposes.

The moulded articles according to this invention may be produced by a batch or continuous process.

Production by a batch process may, for example, be achieved by placing a film composite, such as a polyethylene terephthalate film provided with a copolyester adhesive layer, in a suitable mould so that the adhesive layer is remote from the mould surface. A layer of glass-reinforced unsaturated polyester resin, containing if required a suitable curing agent, is then applied over the adhesive layer and cured.

In a continuous process for the production of sheet laminates according to this invention, a layer of a curable unsaturated polyester resin containing glass-fibre reinforcement may be cast continuously onto the surface of a moving web of a biaxially oriented and heat-set film of polyethylene terephthalate having an untreated surface which is operative for mould release purposes. A film composite comprising a biaxially oriented and heat-set layer of polyethylene terephthalate and an adhesive layer of a copolyester, e.g. of 80 mole % ethylene terephthalate and 20 mole % ethylene isophthalate, may then be applied to the cast resin, the copolyester layer being placed into contact with the cast resin. The cast resin is permitted to cure and the polyethylene terephthalate mould release film stripped from the sheet by virtue of the inherent release properties of the web surface.

The facing layer of synthetic thermoplastic material employed according to this invention provides surface protection for the layer of unsaturated polyester resin. When reinforcing materials are included in the unsaturated polyester resin, the facing layer protects them from becoming exposed at the article surface and hence avoids the risk of moisture penetration into the moulded article through the reinforcing material. The moulded articles may therefore be used where contact with moisture and water is probable without risking damage by moisture and water penetration, e.g. as claddings for buildings. The facing layer of synthetic thermoplastic material may contain, if desired, stabilisers for protection against degradation by ultra-violet light, especially when the moulded articles are intended for external use.

In a preferred embodiment of the invention, a moulded article is produced in the form of a profiled sheet in a form suitable for cladding buildings. A particularly suitable profiled sheet has a sinewave cross-section and may be faced on one or both surfaces with a film composite. Such a profiled sheet may be produced by uniting the curable unsaturated polyester resin and the film composite(s), partially curing the resin, and then shaping or profiling the sheet by passing it over a suitably shaped former before completing the curing of the unsaturated resin.

The invention is further illustrated by the following examples.

EXAMPLE 1

A sheet of 50 microns thick oriented and heatset polyethylene terephthalate film which is available as 'Melinex' type S was positioned as a mould release material over a supporting sheet of glass.

A curable unsaturated polyester resin compositon of the following formulation was prepared (parts being quoted by weight):

| | |
|---|---|
| A clear styrene modified resin conforming to BS 3532:1962 (Type A) which is available as 'Crystic' 191E (Scott Bader) | 100 parts |
| Curing accelerator which is available as 'Novadel' NL 49/ST | 2 parts |
| A 50% by weight solution of methyl ethyl ketone peroxide catalyst | 2 parts |

About half of the resin formulation was cast onto the 'Melinex' type S mould release. Glass-fibre rovings were placed over the resin and the remainder of the resin was poured over the rovings. The resin was distributed evenly by applying pressure with a roller.

A facing sheet of a film composite comprising an oriented and heat-set layer of polyethylene terephthalate and a copolyester layer of 80 mole % ethylene terephthalate and 20 mole % ethylene isophthalate which had been produced by a coextrusion process was placed over the glass-reinforced resin layer with the copolyester layer of the composite in contact with the resin layer. A sheet of glass was finally placed over the film composite to hold the assembly together during curing.

Curing was effected in an oven heated at 120° C. for 45 minutes.

After cooling the cured assembly, the 'Melinex' type S release material was easily peeled from the cured sheet but the copolyester layer of the film composite was firmly bonded to the cured resin layer and was not affected by boiling in water for 30 minutes.

EXAMPLES 2 to 6

The curable unsaturated polyester resin composition specified in Example 1 was applied to the adhesive layers of samples of 50 microns thick adhesive-coated oriented and heat-set films of polyethylene terephthalate and cured by the procedure described in Example 1. The adhesive layers employed were as follows:

| Example | Adhesive layer |
|---|---|
| 2 | A copolymer derived from 45/50/5 % by weight respectively of ethyl acrylate/methyl methacrylate/ methacrylamide and cross-linked by an alkoxylated melamine formaldehyde condensation product. |
| 3 | A 2:1 on weight of solids mixture of 'Eastman Binder' DFB and 'Eastman Size'. ('Eastman Size' is an aqueous solution of a low molecular weight polyester believed to be a polyester of diethylene glycol and isophthalic acid and 'Eastman Binder' DFB is a material believed to contain the same polyester as 'Eastman Size' together with about 10% on weight of solids of a methoxy modified melamine formaldehyde condensate.) |
| 4 | 'Eastman Binder' DFB. |
| 5 | An acrylic copolymer which is available as |
| 6 | 'Glascol' R1196 (believed to contain free hydroxyl and carboxyl groups). Triethanolamine titanate. |

In each example, the polyethylene terephthalate film was firmly bonded to the cured resin layer by the adhesive layer and could not be peeled from the adhesive. Adhesion was unaffected by boiling in water for 30 minutes.

We claim:

1. A process for the production of a moulded article comprising a layer of a cured unsaturated polyester resin faced on at least one surface with a layer of a synthetic linear polyester material, which process comprises applying a layer of a curable unsaturated polyester resin to the copolyester adhesive layer of a film composite comprising a layer of a synthetic linear polyester film and consisting of a biaxially oriented and heat-set film of polyethylene terephthalate a layer consisting essentially of an adhesive copolyester of ethylene terephthalate and ethylene isophthalate, and curing the curable unsaturated polyester resin.

2. A process according to claim 1, in which the copolyester comprises from 65 to 95 mole % of ethylene terephthalate and from 35 to 5 mole % of ethylene isophthalate.

3. A process according to claim 2, in which the copolyester comprises a copolyester of 80 mole % ethylene terephthalate and 20 mole % ethylene isophthalate.

4. A process according to claim 1, in which the film composite is produced by coextruding a copolyester adhesive layer with a polyethylene terephthalate layer and is stretched to orient the polyethylene terephthalate layer and heat set.

5. A process according to claim 1, in which the unsaturated polyester resin layer contains finely divided particulate fillers and/or fibrous reinforcement.

6. A process according to claim 1, wherein a moulded article in the form of a sheet laminate is produced by applying a film composite comprising a biaxially oriented and heat-set layer of polyethylene terephthalate and a copolyester adhesive layer to a continuously moving layer of curable unsaturated polyester resin.

7. A process according to claim 6, in which the layer of curable unsaturated polyester resin is continuously cast upon a moving web of film and the film composite applied to the cast layer of unsaturated polyester resin.

* * * * *